United States Patent [19]
Fox et al.

[11] 3,841,122
[45] Oct. 15, 1974

[54] ROLLING MILL GAUGE CONTROL METHOD AND APPARATUS INCLUDING FEEDBACK CORRECTION

[75] Inventors: Richard Q. Fox, Pittsburgh; Donald J. Emberg, Vandergrift, both of Pa.

[73] Assignee: Westinghouse Electric Corporation, Pittsburgh, Pa.

[22] Filed: Nov. 6, 1972

[21] Appl. No.: 303,722

[52] U.S. Cl. .................................. 72/6, 72/19
[51] Int. Cl. ............................................ B21b 37/00
[58] Field of Search .............................. 72/6–12, 16, 72/19

[56] References Cited
UNITED STATES PATENTS

| | | | |
|---|---|---|---|
| 3,232,084 | 2/1966 | Sims | 72/16 |
| 3,561,237 | 2/1971 | Eggers et al. | 72/7 |
| 3,709,008 | 1/1973 | Smith, Jr. | 72/8 |

*Primary Examiner*—Milton S. Mehr
*Attorney, Agent, or Firm*—R. G. Brodahl

[57] ABSTRACT

An automatic gauge control is disclosed to provide on line control of the delivery gauge or thickness from at least two roll stands of a tandem rolling mill. The gauge error of the workpiece strip leaving one of said roll stands is corrected by predetermined adjustment of a selected previous other roll stand in relation to the workpiece gauge error measured at that one roll stand and to provide a feedback gauge error correction in relation to that one roll stand.

8 Claims, 8 Drawing Figures

ROLLING MILL GAUGE CONTROL METHOD AND APPARATUS INCLUDING FEEDBACK CORRECTION

CROSS REFERENCE TO RELATED APPLICATIONS

Reference is made to the following previously filed and related patent application which is assigned to the present assignee:

S.N. 215,743, field Jan. 6, 1972 and entitled Gauge Control Method and Apparatus For Metal Rolling Mills and filed by A. W. Smith and R. Q. Fox.

Reference is made to the following concurrently filed and related patent applications which are assigned to the present assignee:

S.N. 303,723, filed Nov. 6, 1972 and entitled Rolling Mill Gauge Control Method and Apparatus Including Temperature and Hardness Correction and filed by A. W. Smith.

S.N. 303,721, filed Nov. 6, 1972 and entitled Rolling Mill Gauge Control Method and Apparatus Including Entry Gauge Correction and filed by A. W. Smith and R. Q. Fox.

S.N. 303,725, filed Nov. 6, 1972 and entitled Rolling Mill Gauge Control Method and Apparatus Including Speed Correctin and filed by R. Q. Fox.

S.N. 303,724, filed Nov. 6, 1972 and entitled Rolling Mill Gauge Control Method and Apparatus Including X-Ray Correction and filed by R. Q. Fox.

S.N. 303,726, filed Nov. 6, 1972 and entitled Rolling Mill Gauge Control Method and Apparatus Including Plasticity Determination and filed by R. Q. Fox.

BACKGROUND OF THE INVENTION

The present invention relates to workpiece strip metal tandem rolling mills and more particularly to roll force gauge control systems and methods used in operating such rolling mills.

In the operation of a metal or steel reversing or tandem rolling mill, the unloaded roll opening and the speed at each tandem mill stand or for each reversing mill pass are set up to produce successive workpiece strip or plate reductions resulting in work product at the desired gauge. Generally, the loaded roll opening at a stand equals the stand delivery gauge or thickness on the basis of the usual assumption that there is little or no elastic work-piece recovery.

Since the operator provided initial roll opening setup conditions, or the initial roll opening settings provided by an associated digital computer control system operative with model equation information to calculate the setup screwdown schedules for the respective stands of the rolling mill, can be in error and since in any even certain mill parameters affect the stand loaded roll opening during rolling and after setup conditions have been established, a stand automatic gauge control system is employed if it is necessary that the stand delivery gauge be closely controlled. Thus, at the present rate of the rolling mill art, and particularly the steel rolling mill art, a stand gauge control system is normally used for a reversing mill stand and for predetermined stands in tandem rolling mills.

The well known gaugemeter or roll force system has been widely used to produce stand gauge control in metal rolling mills and particularly in tandem hot stell strip rolling mills and reversing plate mills where experience has demonstrated that roll force control is particularly effective. Earlier publications and patents such as an article entitled Installation and Operating Experience with Computer and Programmed Mill Controls by M. D. McMahon and M. A. Davis in the 1963 Iron and Steel Engineer Year Book at pages 726 to 733, an article entitled Automatic Gage Control for Modern Hot Strip Mills by J. W. Wallace in the December 1967 Iron and Steel Engineer at pages 75 to 86, U.S. Pat. No. 3,561,237 issued to Eggers et al and U.S. Pat. No. 2,726,541 issued to R. B. Sims describe the theory upon which operation of the roll force and related gauge control systems are based. Attention is also called to U.S. Pat. Nos. 3,568,637, 3,574,279, 3,574,280 and 3,600,920 issued to A. W. Smith, which relate to roll force automatic gauge control systems. In referencing prior art publications or patents as background herein, no representation is made that the cited subject matter is the best teaching prior art.

Briefly, the roll force gauge control system uses Hooke's law in controlling the screwdown position at a rolling stand, i.e., the loaded roll opening under workpiece rolling conditions equals the unloaded roll opening or screwdown position plus the mill stand spring stretch caused by the separating force applied to the rolls by the workpiece. To embody this rolling principle in the roll force gauge control system, a load cell or other force detector measures the roll separating force at each controlled roll stand and the screwdown position is controlled to balance roll force changes from a reference value and thereby hold the loaded roll opening at a substantially constant value. Hot strip mill automatic gauge control (AGC) incluuing evaluation of roll force feedback information involves the combination of a number of process variables, such as roll force, screw position, and mill spring which are all used to evaluate the gauge of the srtip as it is worked in each stand. In addition, an X-ray gauge is used on the strip as it passes out of the last stand to evaluate the absolute strip gauge produced.

The two gauge error detection systems that are commonly used are the X-ray and roll force. X-ray gauges can be placed between each stand, but they are expensive, difficult to maintain, and can detect errors only as the strip passes between stands. The roll force error detection system is much less expensive, and can be more easily implemented in relation to the operation of all stands, to detect errors in gauge as the strip passes between the rolls of a particular roll stand, providing immediate evaluation of desired corrections to the roll openings. The roll force system, however, provides only a relative evaluation of the gauge, since it measures the amount of gauge deviation from a reference gauge, such as the gauge at the head end of the strip.

A practical combination of the two systems uses rollforce feedback to calculate fast corrections to fluctuations in gauge, and an X-ray gauge to evaluate the absolute gauge of the strip coming out of the last stand. The fast corrections are calculated from the rollforce feedback, the stand screwdown position, and the modulus of elasticity of the rolling stand. The slower X-ray gauge evaluation calculates simultaneous corrections to several stands, so that the absolute value of the gauge may be brought to the desired value.

The output of both of these systems is a change in the position references supplied to the screwdowns of selected roll stands.

The following well known formula expresses the basic roll force gauge control relationship:

$$h = SD + F * K \qquad (1)$$

where:

$h =$ loaded roll opening (workpiece delivery gauge or thickness)
$SD =$ unloaded roll opening (screwdown position)
$K =$ stand mill spring constant
$F =$ stand roll separating force. Typically, the roll force gauge control system is an analog arrangement including analog comparison and amplification circuitry which responds to roll force and screwdown position signals to control the screwdown position and hold the following equality:

$$\Delta SD = -\Delta F * K \qquad (2)$$

where:

$\Delta F =$ measured change in roll force from an initial force
$\Delta SD =$ controlled change in screwdown position from an initial screwdown position. After the unloaded roll opening setup and the stand speed setup are determined by the mill operator for a particular workpiece pass or series of passes, the rolling operation is begun and the screwdowns are controlled to regulate the workpiece delivery gauge from the reversing mill stand or from each roll force controlled tandem mill stand. By satisfying Equation (2), and the assumptions implicit in Equation (1), the loaded roll opening $h$ in Equation (1) is maintained constant or nearly constant.

As the head end of the workpiece strip enters each roll stand of the mill, the lock-on screwdown position LOSD and the lock-on roll separating force LOF are measured to establish what strip delivery gauge $G$ should be maintained out of that roll stand. As the strip rolling operation proceeds, the roll stand separating force $F$ and the roll stand screwdown position value $SD$ are monitored periodically and any undesired change in roll separating force is detected and compensated for by a corresponding correction change in screwdown position. The lock-on gauge LOG is equal to the lock-on screwdown LOSD plus the lock-on force LOF multiplied by the mill stand spring modulus $K$. The workpiece strip delivery gauge $G$ leaving the roll stand at any time during the rolling operation is in accordance with above equation (1) and is equal to the unloaded screwdown position $SD$ plus the roll separating force $F$ multiplied by the mill spring modulus $K$. The roll force determined gauge error GE in relation to a particular roll stand is derived by subtracting the lock-on gauge LOG from the present delivery gauge $G$. The following Equations (3), (4) and (5) set forth these relationships.

$$LOG = LOSD + K*LOF \qquad (3)$$

$$G = SD + K*F \qquad (4)$$

$$GE = G - LOG = [SD - LOSD] + (F-LOF)*K \qquad (5)$$

To provide steady state gauge error correction, the well known X-ray monitor gauge control system is usually employed to produce screwdown offset for the roll force control. In the monitor system, an X-ray or other radiation gauge sensing device is placed at one or more predetermined process points, and usually at least at a process point following the delivery end after the last roll stand of the mill, in order to sense actual delivery gauge after a workpiece transport delay from the point in time at which the actual delivery gauge is produced at the preceding stand or stands. The monitor system compares the actual delivery gauge with the desired delivery gauge and develops an X-ray gauge error as an analog feedback control signal to adjust the operation of the reversing mill roll force gauge control system or one or more predetermined tandem mill stand roll force gauge control systems to supply desired steady state mill delivery gauge. In this manner, the conventional monitor system provides for transport delayed correction of steady state gauge errors which are caused or which are tending to be caused by a single mill variable or by a combination of mill variables.

In operator controlled mills, some steady state gauge correcting operations can eventually be taken off the monitor system by screwdown recalibration, and the like, between similar workpiece passes if steady state gauge error tends to exist along the entire workpiece and persists from workpiece to workpiece. In this manner, some reduction is achieved in the length of off gauge workpiece material otherwise associated with monitor transport delay. Similarly, corrective monitor system operation caused by head end gauge errors can be reduced by changes in the operator or associated computer control system provided setup from workpiece to workpiece.

A background general teaching of stored program digital computer control system operation is set forth in a book entitled Electronic Digital Systems by R. K. Richards and published in 1966 by John Wiley and Sons.

An additional detailed description of computer programming techniques in relation to the control of metal rolling mills can be found in an article in the Iron and Steel Engineer Yearbook for 1966 at pages 328 through 334 entitled "Computer Program Organization for an Automatically Controlled Rolling Mill" by John S. Deliyannides and A. H. Green, and in another article in the Westinghouse Engineer for January 1965 at pages 13 through 19 and entitled "Programming for Process Control" by P. E. Lego.

A programmed digital computer system can be employed to make the gauge error correction screwdown movement determinations as well as to perform other mill control functions. The computer employs a programming system including an automatic roll force gauge control program or AGC program which is executed at predetermined periodic intervals to calculate the desired screwdown movement required at each roll force gauge controlled stand for gauge error correction including that stemming from roll force error detection at that stand.

SUMMARY OF THE INVENTION

In accordance with the broad principle of the present invention, a system and method for controlling gauge in a metal rolling mill employs means for detecting at least one error condition representing gauge error in the workpiece delivered from a given roll stand, and means for controlling the screwdwn position of at least one previous rolling stand of the mill for providing a predetermined feedback correction to the gauge in relation to that given roll stand and this detected gauge error.

DESCRIPTION OF THE GAUGE CONTROL SYSTEM AND ITS OPERATION

Figure 1:
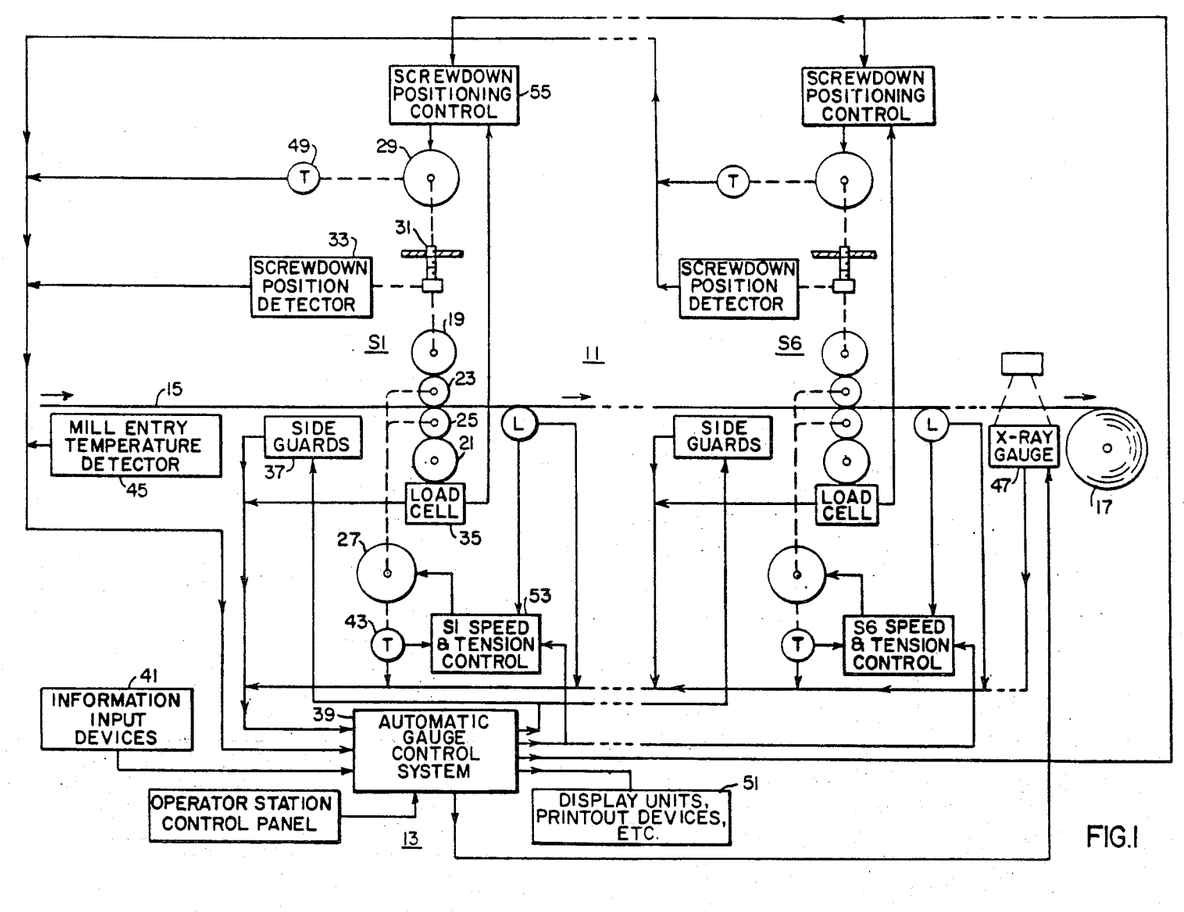
FIG. 1 shows a schematic diagram of a tandem hot steel strip rolling mill and an automatic gauge control system arranged for operation in accordance with the present invention.

There is shown in FIG. 1 a tandem hot strip steel finishing mill 11 operated with improved gauge control performance by a process control system 13 in accordance with the principles of the invention. Generally, however, the invention is applicable to various types of mills in which roll force gauge control is employed.

The tandem mill 11 includes a series of reduction rolling stands with only two of the stands S1 and S6 shown. A workpiece 15 enters the mill 11 at the entry end in the form of a bar and it is elongated as it is transported through the successive stands to the delivery end of the mill where it is coiled as a strip on a downcoiler 17. The entry bar would be of known steel grade class and it typically would have a known input gauge or thickness of about 1 inch and a width within some limited range such as 20 inches to 80 inches. The delivered strip would usually have approximately the same width and a thickness based upon the production order for which it is intended.

In the reduction rolling process, the successive stands operate at successively higher speeds to maintain proper workpiece mass flow. Each stand produces a predetermined reduction or draft such that the total mill draft reduces the entry bar to strip with the desired gauge or thickness.

Each stand is conventionally provided with a pair of backup rolls 19 and 21 and a pair of work rolls 23 and 25 between which the workpiece 15 is passed. A large DC drive motor 27 is controllably energized at each stand to drive the corresponding work rolls at a controlled speed.

As previously described, the sum of the unloaded work roll opening and the mill stretch substantially defines the workpiece gauge delivered from any particular stand in accordance with Hooke's law. To vary the unloaded work roll opening at each stand, a pair of screwdown motors 29 (only one shown at each stand) position respective screwdowns 31 (only one shown at each stand) which clamp against opposite ends of the backup rolls and thereby apply pressure to the work rolls. Normally, the two screwdowns 31 at a particular stand would be in identical positions, but they can be located in different positions for strip guidance during threading, for flatness or other strip shape control purposes or possibly for other purposes.

A conventional screwdown position detector or encoder 33 provides an electrical signal representation of screwdown position at each stand. To provide an absolute correspondence between the screwdown position and the unloaded roll opening between the associated work rolls, a screwdown position detection system which includes the screwdown position detector 33 can be provided and calibrated from time to time.

Roll force detection is provided at each of predetermined stands by a conventional load cell 35 which generates an electrical analog signal in accordance with the stand roll force. At the very least, each roll force controlled stand is provided with a load cell 35 and in many cases stands without roll force gauge control would also be equipped with load cells. The number of stands to which roll force gauge control is applied is predetermined during the mill design in accordance with cost-performance standards, and increasingly there is a tendency to apply roll force gauge control to all of the stands in a tandem hot strip stell mill. In the present case, a roll force gauge control system is assumed to be employed at each of the stands.

Conventional motorized sideguards 37 are located at predetermined points along the mill length. The sideguards 37 are operated during mill setup on the basis of the widths of the upcoming workpiece 15 thereby defining the sides of the workpiece travel path for guidance purposes.

The process control system 13 provides automatic control for the operation of the tandem mill 11 as well as desired control for associated production processes (not indicated) such as the operation of a roughing mill. The process control system 13 can include a programmed process control digital computer system which is interfaced with the various mill sensors and the various mill control devices to provide control over many of the various functions involved in operating the tandem mill 11. According to user preference, the control system 13, can also include conventional manual and/or automatic analog controls for selected process control functions.

On the basis of these considerations, automatic gauge control system 39 can include a digital computer system operative to provide the finishing mill on-line roll force gauge control function, such as a Prodac 2000 (P2000) sold by Westinghouse Electric Corporation. A descriptive book entitled Prodac 2,000 Computer Systems Reference Manual has been published in 1970 by Westinghouse Electric Corporation and made available for the purpose of describing in greater detail this computer system and its operation.

There is disclosed in the above-referenced previoussly filed patent application S.N. 215,743 the logic flow chart of an illustrative automatic gauge control suitable for operation in conjunction with the entry gauge correction operation of the present invention. It should be readily understood by persons skilled in this art that the present invention is also suitable for operation with other presently well known automatic gauge control systems for controlling the delivery gauge of a workpiece strip passed through at leat two stands of a rolling mill.

The digital computer processor can be associated with well known predetermined input systems typically including a conventional contact closure input system which scans contact or other signals representing the status of various process conditions, a conventional analog input system which scans and converts process analog signals, and operator controlled and other information input devices and systems 41 such as paper tape teletypewriter and dial input systems. It is noted that the information input devices 41 are generally indicated by a single block in FIG. 1 although different input devices can and typically would be associated with the control system. Various kinds of information are entered into the control system through the input devices 41 including, for example, desired strip delivery gauge and temperature, strip entry gauge and width and temperature (by entry detectors if desired), grade of steel being rolled, plasticity tables, hardware oriented programs and control programs for the programming system, and so forth. The principal control action outputs from the automatic gauge control or AGC system include screwdown positioning reference commands which are applied to respective screwdown positioning controls 55 for operating the screwdown motors 29 for screw movement, and speed control signals which are applied to the respective speed and tension control system 53 to cause a change in drive speed to compensate the force on the strip for a change in thickness being made by a screwdown movement.

Display and printout devices 51 such as numeral display, tape punch, and teletypewriter systems can also be provided to keep the mill operator generally informed about the mill operation and in order to signal the operator regarding an event or alarm condition which may require some action on his part. The printout devices are also used to log mill data according to computer log program direction.

Generally, the AGC system uses Hook's law to determine the total amount of screwdown movement required at each roll force controlled stand at the calculating point in time for roll force and gauge error correction, i.e., for loaded roll opening and stand delivery gauge correction to the desired value. The calculation defines the total change in the unloaded roll opening required to offset the gauge error causing condition.

During rolling operation, the on line gauge control system operates the stands to produce strip product having desired gauge and proper shape, i.e., flat with slight crown. On line gauge control is produced by the roll force gauge control loops at the stands and the previously noted X-ray monitor gauge control system.

In the monitor system, the X-ray gauge 47 produces the X-ray gauge error or deviation signal which indicates the difference between actual strip delivery thickness and desired or target strip delivery thickness. In other cases, it may be desirable to employ an absolute thickness measurement X-ray gauge signal to form a basis for monitor control actions or, more generally, for screwdown offset control actions.

To effect on line gauge control in the closed loops, the AGC system operates at predetermined time periods such as every two-tenths second with the screwdown position detector and load cell provided signals from each stand as well as the X-ray gauge error signal to determine the respective stand screwdown adjustment control actions required for producing desired strip delivery gauge.

Figure 2:
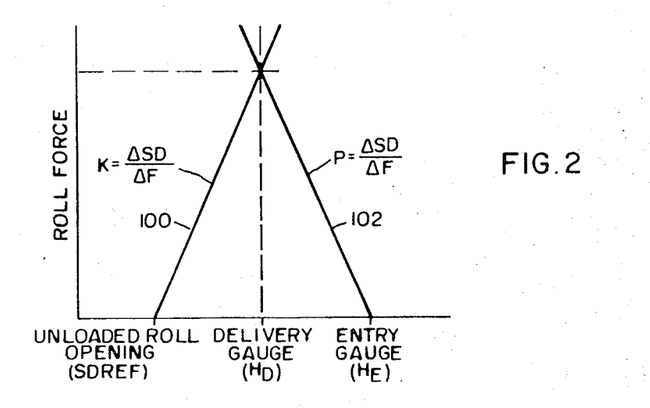
FIG. 2 illustrates the typical mill spring curve and workpiece reduction curve for a given rolling mill stand and the operation of that roll stand for reducing the gauge of a workpiece passed through the roll stand.

In FIG. 2, linear approximations of the roll stand characteristic curves are shown to illustrate the application of Hooke's law to a rolling mill stand and to illustrate the basis upon which the on line gauge control system provides improved gauge control, accuracy and stability and other operating benefits. A mill modulus characteristic or mill spring curve 100 defines the separation between a pair of workpiece reducing mill stand work rolls as a function of separating force and as a function of screwdown position. The slope of the mill spring curve 100 is the well known mill spring modulus or constant K which is subject to variation as well known to persons skilled in this art. When a correct screwdown calibration is known and the screwdowns are positioned such that the empty work rolls are just facing, the unloaded screwdown zero position is defined. The workpiece deformation characteristic or reduction curve 102 is shown. The entry gauge $H_E$ of the workpiece passed through the roll stand is reduced to the indicated delivery gauge $H_D$ as defined by the intersection of the mill spring curve 100 and the product reduction curve 102 to establish the stand roll force required for the indicated operation. The unloaded roll opening, sometimes called the screwdown because of the screw and nut system used for adjusting the roll opening, is the gauge that would be delivered if there were no roll separating force. As the force increases with a constant roll opening, the delivery gauge increases, since the mill deflects as shown by the mill spring curve 100. If no force was exerted on the product being rolled, the gauge would not be reduced and the delivery gauge would be equal to the entry gauge. When the roll force increases, the product is plastically deformed and the delivery gauge decreases. The slope of the mill spring characteristic line is called the mill modulus (K) and the slope of the product reduction characteristic is called the product plasticity (P). The delivery gauge is determined by the equilibrium point at which the force exerted by the mill is equal to the force required to deform the product. Changes in entry gauge and product hardness result in a change in roll force and delivery gauge. The automatic gauge control moves the screwdown to correct for these gauge changes. The main advantage of the roll-force gauge control system is its ability to detect changes in gauge the instant they take place, as the product is being rolled in the stand. A shift in delivery thickness can be caused by a change in entry thickness or a change in hardness (usually caused by a change in temperature). This change in delivery gauge is immediately detected by monitoring the roll separating force of the roll stand.

When the screwdowns are opened (positive movement) the unloaded roll opening increases as reflected by a change to the right in the graphical location of the mill spring curve 100 such that the theoretical spring curve intersect equals the new unloaded roll opening. With screwdown closing, the mill spring curve is shifted to the left in a similar manner.

At any particular screwdown position and with correct screwdown calibration, the stand workpiece delivery gauge $H_D$ equals the unloaded roll opening as defined by the screwdown position SDREF plus the mill stretch (F*K) caused by the workpiece. If the screwdown calibration is incorrect, i.e., if the number assigned to the theoretical roll facing screwdown position is something other than zero because of roll crown wear or other causes, the stand workpiece delivery gauge $H_D$ then equals the unloaded roll opening plus the mill stretch plus or minus the calibration drift.

The amount of mill stretch depends on the product deformation characteristic or reduction curve 102 for the workpiece. As shown in FIG. 2, the reduction curve 102 for a strip of predetermined width represents the amount of force F required to reduce the workpiece from the stand entry gauge (height) $H_E$. The workpiece plasticity P is the slope of the curve 102, and the curve 102 is shown as being linear although a small amount of nonlinearity would normally exist.

Desired workpiece delivery gauge $H_D$ is produced since the amount of force F required to reduce the workpiece from $H_E$ to $H_D$ is equal to the amount of roll separating force required to stretch the rolls to a loaded roll opening $H_D$, i.e., the intersection of the mill spring curve 100 at an initial screwdown opening SDREF indicated by mill spring curve 100 and the workpiece reduction curve 102 lies at the desired gauge value $H_D$.

Figure 3:
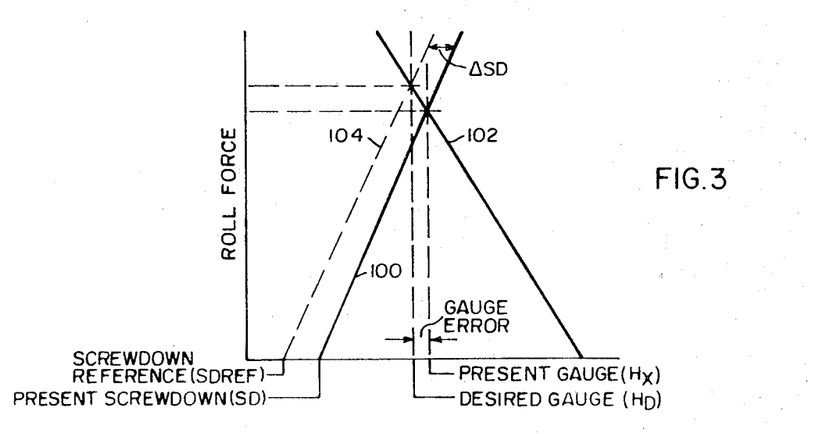
FIG. 3 illustrates, in relation to the mill spring curve and the workpiece reduction curve, the effect of a correction made to the screwdown position setting for changing the unloaded roll opening of a roll stand to provide a desired change in the workpiece gauge delivered from that roll stand.

As shown in FIG. 3, if the actual stand present gauge Hx is not the same as the desired gauge $H_D$, there is a gauge error GE to be corrected. This condition can be corrected by changing the provided screwdown position reference SDREF to the stand, such that a new mill spring curve 104 becomes operative to result in the desired gauge $H_D$ being delivered from the roll stand and the gauge error GE is now removed.

The workpiece exit gauge leaving a previous roll stand (N−1) is equal to the workpiece entry gauge advanced to the next succeeding roll stand (N) since no reduction has been made in the workpiece gauge.

Exit gauge (N−1) = entry gauge (N)  (6)

It is known in accordance with the teachings of above referenced U.S. Pat. 3,561,237 that the required corrective screwdown adjustment $\Delta SD(N)$ to correct a stand (N) delivery gauge error GE(N) is equal to the product of that gauge error GE(N) times the sum of the ratio of the workpiece plasticity P(N) for that ssame stand with the mill spring modulus K(N) for that same stand and one, as follows in relation to stand (N):

$$\Delta SD(N) = \text{exit } GE(N) * [P(N)/K(N)+1]$$

(7)

In the teachings of the latter patent, the mill spring constant K(N) was defined in terms of millions of pounds of roll force per inch of screwdown position change. The workpiece plasticity P(N) was similarly defined. It has been established in relation to the practice of the present invention that these values are preferred in terms of inches of screwdown position change per millions of pounds of roll force, as indicated in FIG. 2. Thusly, the above equation (7) will be rewritten and utilized in accordance with the relationship:

$$\Delta SD(N) = \text{exit } GE(N) * [K(N)/P(N)+1]$$

(8)

From a logical extension of the above equation (6), it can be established that the exit gauge error GE(N) leaving stand (N−1) is equal to the entry gauge error entering the succeeding roll stand N, since no reduction is made in the workpiece thereby:

Exit gauge error (N−1) = entry gauge error (N)

(9)

The total stand (N−1) gauge error GE(N−1) that it is desired be corrected by screwdown adjustment at stand N−1 is equal to the roll force system determined gauge error at stand (N−1) plus the desired to be corrected feedback gauge error from stand N that is determined at stand N by operation of the stand N roll force system.

TOTAL GE(N−1) = roll force exit gauge error GE(N−1) + feedback gauge error FB error GE(N−1)

(10)

The stand (N−1) exit gauge error determined by the roll force system at stand (N−1) is established by the relationship of above equation (5) as follows:

$$GE(N-1) = SD(N-1) - LOSD(N-1) + [F(N-1) - LOF(N-1)] * K(N-1)$$

(11)

The stand N exit gauge error determined by the roll force system at stand (N) is established by the relationship of above equation (5) as follows:

$$GE(N) = [SD(N) - LOSD(N)] + [F(N) - LOF(N)] * K(N)$$

(12)

DESCRIPTION OF EMBODIMENT OF PRESENT INVENTION

It is desired that a predetermined portion of this stand (N) exit gauge error be corrected by changing the entry gauge of the workpiece strip before it enters stand (N), which change is effected by a correlated screwdown adjustment of previous stand (N − 1) such that the exit gauge from stand (N − 1) is now changed in accordance with the determined feedback gauge error for stand N, which is applied as a feedback correction from stand N.

The feedback gauge error FBGE(N−1) for application at the previous stand (N−1) is determined as the product of the roll force exit gauge error of stand N times the ratio of the speed S(N) of stand N to the speed S(N−1) of stand (N−1) times a first adjustment parameter relationship, added to the product of the previous or old value of the determined feedback gauge error OLDFBGE(N−1) for stand (N−1) times a second adjustment parameter relationship, as follows:

$$FBGE(N-1) = \text{exit } GE(N) * S(N)/S(N-1) * L1/L2 + OLDFBGE(N-1) * L3/L4 \quad (13)$$

where exit $GE(N)$ is the roll force determined exit gauge error leaving stand ($N$) and established in accordance with above equation (5), where $S(N)/S(N-1)$ is the ratio of the speeds, where $L1/L2$ is the first parameter relationship having a typical value of 0.15 for each of the roll stands, where $OLDFBGE(N-1)$ is the previously determined value of the feedback gauge error stored in a suitable memory, and where $L3/L4$ is the second parameter relationship having a typical value of 1.00 for each of the roll stands.

Figure 5:
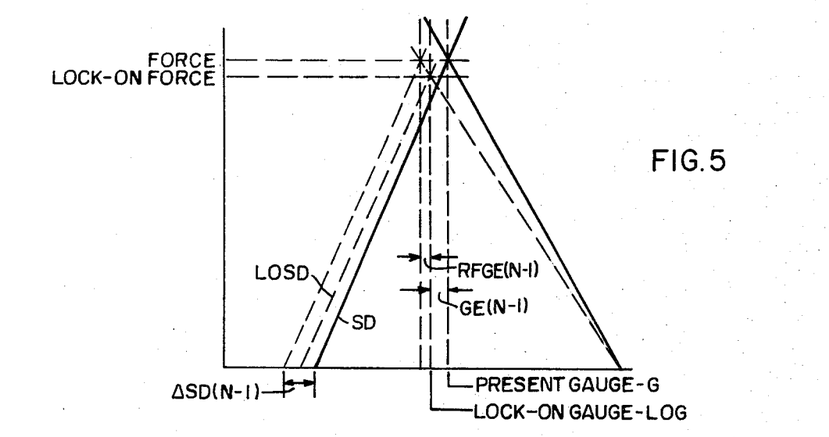
FIG. 5 shows an adjustment made in the screwdown position of previous stand N–1 as required to correct for the determined gauge error of previous stand N–1 and provide the desired correction of the feedback gauge error from the subsequent roll stand N.

Each time that a gauge error calculation is made in relation to stand (N) and stand (N−1), the feedback correction gauge error FBGE(N−1) is determined and added to the roll force determined exit gauge error at stand (N−1) as illustrated in FIG. 5, such that stand (N−1) positions itself according to above equation (8) and the following relationship:

$$\Delta SD(N-1) = [GE(N-1) + FBGE(N-1)] * K(N-1)/P(N-1)+1] \quad (14)$$

It should be noted that the ratio $L1/L2$ is selected to provide the desired degree of faster acting proportional response and the ratio $L3/L4$ is selected to provide the desired degree of slower acting integral response, such that above equation (13) provides the effect of a proportional integrator in that the first term provides an instantaneous response to changes in the gauge error of stand (N) while the second term provides an integral response to the long term trend in the gauge error of stand (N). This feedback correction operation tends to bring the operation of each individual stand into calibration with respect to the other stands. Each stand controlled by the AGC program in accordance with above equations (5) and (8) locks on to the head end measurement values of each workpiece strip passing through that stand. One problem with this procedure is that no two stands consider the head end exactly the same, and for this reason each stand is controlled in relation to its own reading of the desired gauge condition. The integral term of the feedback gauge error is operative to bring the individual stands into better agreement in relation to what the desired gauge condition is.

Figure 6:
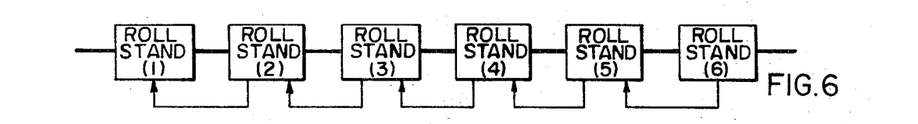
FIG. 6 shows an illustration of the feedback gauge error correction operation in accordance with the present invention.

The feedback gauge error FBGE(N−1) is continuously determined for each stand other than the first stand and applied as shown in FIG. 6 to the respective previous stand of the rolling mill.

Figure 4:
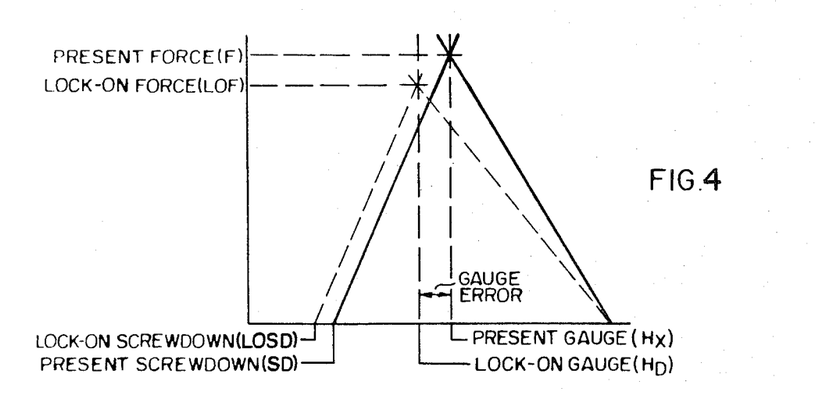
FIG. 4 shows an illustrative gauge error determination operation in relation to initial lock on conditions at the head end of the workpiece.

In reference to FIG. 4, in general the workpiece strip gauge error delivered by a given stand, (N), and as determined by the sensed operational variables at that same stand, is in accordance with the roll force system relationship shown in above equation (12). The exit gauge error leaving stand (N), for example, equals the sum of a first quantity, which is the difference between the presently measured screwdown position SD(N) and the initial lock on screwdown position LOSD(N), and a second quantity, which is the determined mill spring modulus K(N) times the difference between the presently measured roll separation force F(N) and the initial lock on roll force LOF(N).

Figure 7:
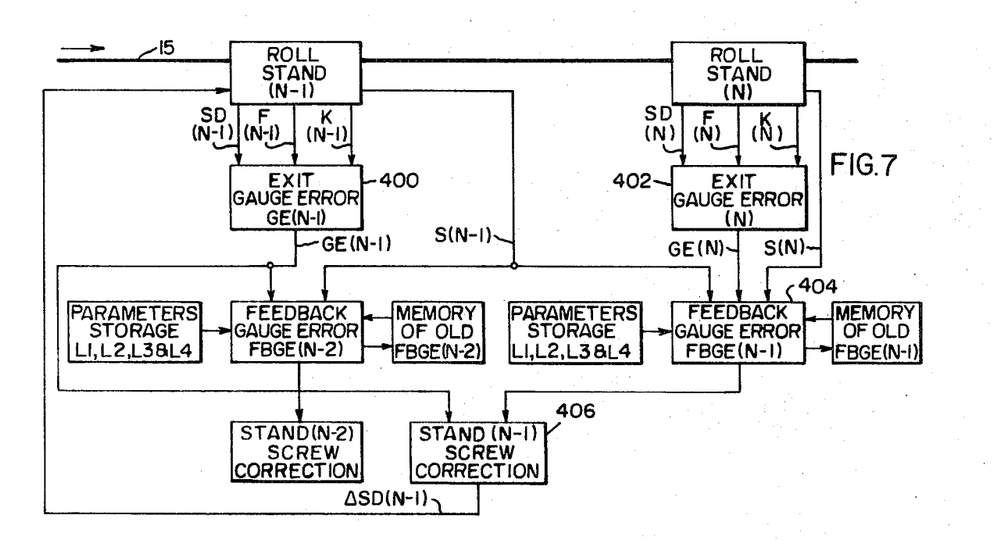
FIG. 7 shows a schematic illustration of the feedback gauge error correction control in accordance with the present invention.

In reference to FIG. 7, there is shown a portion of a tandem rolling mill including a roll stand (N−1) followed by a roll stand (N), with the workpiece strip 15 moving in the direction indicated by the arrow. At block 400 there is determined the exit gauge error leaving stand (N−1) in relation to the operational variables sensed at stand (N−1). This determination utilizes above equation (11) for this purpose. At block 402 there is determined the exit gauge error leaving stand (N) in relation to the operational variables sensed at stand (N), and this determination utilizes above equation (12) for this purpose. At block 404 there is determined the feedback gauge error for correcting the operation of stand (N) in relation to the operational variables sensed at stand (N), and this utilizes above equation (13) for this purpose. At block 406 there is determined the total stand (N−1) screwdown position correction needed to remove both the exit gauge error at stand (N−1) as well as the feedback gauge error from stand (N), and this utilizes above equation (14) for this purpose.

Figure 8:
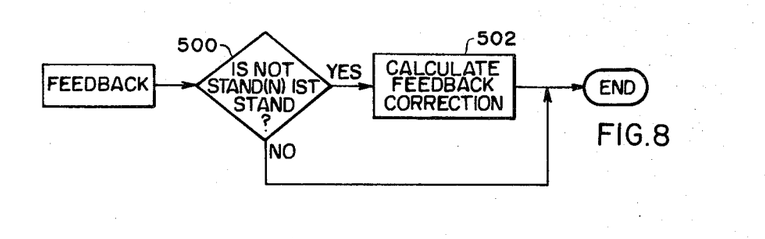
FIG. 8 shows an illustrative logic flow chart of a suitable feedback gauge error control program operative in accordance with the present invention.

In relation to the here provided feedback gauge error correction, in FIG. 8 there is shown a flow chart to illustrate the operation of a suitable computer program. At step 500 a determination is made to see if this is not the first stand since no feedback gauge error correction can be physically fed back to an earlier stand if this is the first stand, so the program ends. At step 502 the feedback gauge error for the preceding stand (N−1) is determined in accordance with above equation (13).

In general, the feedback gauge error determining program is entered every time the AGC program operates to calculate a roll force gauge error for the respective roll stands using above equation (12) and related screwdown adjustment using above equation (8). The typical AGC control program is written as a loop operation such that one set of coding processes all of the roll stands, and every time the program operates through the loop a calculation is made when appropriate for each of the roll stands in relation to both the exit gauge error for a given roll stand and the feedback gauge error for a previous roll stand (N−1).

In the following table there are illustrated suitable values for the first adjustment parameter relationship $L1/L2$ and the second adjustment parameter relationship $L3/L4$ in terms of the respective stands of a typical rolling mill, which values have been tried in an actual operation of the feedback gauge error control procedure in accordance with the present invention.

| Roll Stand | | |
|---|---|---|
| (1) | 0.15 | 1.00 |
| (2) | 0.15 | 1.00 |
| (3) | 0.15 | 1.00 |
| (4) | 0.15 | 1.00 |
| (5) | 0.15 | 1.00 |
| (6) | 0.15 | 1.00 |
| | $\frac{L1}{L2}$ | $\frac{L3}{L4}$ |

A typical actual gauge error signal for a good control operation is almost zero and in fact, a good gauge control system will keep the actual gauge error for a typical stand at plus or minus zero, so fifteen percent of plus or minus zero and integrated by the intergrating part of the equation integrates substantially to zero. Once a roll stand operation gets into trouble or goes into limits, such as when a skid mark passes through the stand or any of a number of similar things happens, the determined gauge error goes away from zero. Fifteen percent of the resulting perhaps large number is a meaningful feedback correction, and a calculation time period later, another fifteen percent correction is made again, added to the previous fifteen percent so now its a thirty percent correction, fed back to the previous stand. A calculation time delay later, add still another fifteen percent correction providing up to a forty-five percent correction. The control system integrates up until a limit is reached such that a maximum magnitude of the integral feedback correction component has a predetermined value typically about twenty hundredths of a millimeter.

The entire automatic gauge control system may be working on units of one hundredths of a millimeter for controlling delivery gauge out of typical stand N. Twenty is a big number in terms of gauge error control system operation, and the reason for limiting the integral component to twenty is to provide a faster control system response because a continuous calculation is taking place here while integrating up the stand N gauge error even before any error correction results are sensed at stand N. There is a transport time delay that the control system is ignoring, and it takes time for that gauge error correction introduced at stand (N−1) to get to stand N. The control system is integrating up the stand (N−1) gauge error as long as the error is measured at stand N. Once the gauge error correction made at stand (N−1) does arrive at stand N, the control system will sense that some good was done and will cause the integral to start to fall down, with the rate that it falls down being a function of how good a gauge error correction job was done. Since an integral only falls down by adding a negative component to it, the magnitude of the integral, which is just a summation, should stay the same upon providing the condition of zero gauge error. The end result is that when the desired value of zero gauge error is provided at stand N, the integral component remains substantially constant at some value that continues to be fed back to the previous stand as a gauge error feedback correction so the control system operation stabilizes at zero gauge error at stand N with substantially the same integral always being fed back to stand (N−1).

When the next succeeding workpiece strip comes along, all of the integral components of the respective stand feedback gauge error corrections are zeroed out at the end of each workpiece strip.

GENERAL DESCRIPTION OF INSTRUCTION PROGRAM LISTING

Reference is here made to an instruction program listing disclosed in above related application Ser. No. 303,726 and that has been prepared to control the roll force automatic gauge control operation of a tandem rolling mill in accordance with the here disclosed control system and method. The instruction program listing is written in the machine language of the PRODAC P2000 digital computer system, which is sold by Westinghouse Electric Corporation for real time process control computer applications. Many of these digital computer systems have already been supplied to customers, including customer instruction books and descriptive documentation to explain to persons skilled in this art the operation of the hardware logic and the executive software of this digital computer system. This instruction program listing is included to provide an illustration of one suitable embodiment of the present control system and method that has actually been prepared. This instruction program listing at the present time has been partially debugged through the course of practical operation for the real time automatic gauge control of a tandem rolling mill, but it is understood and well known by persons skilled in this art that most real time process control application programs contain some bugs or minor errors, and it is within the routine skill of such persons and takes varying periods of actual operation time to identfy and correct the more critical of these bugs.

A person skilled in the art of writing computer instruction program listings, particularly for an invention such as the present roll force automatic gauge control system and method for a tandem rolling mill must generally go through the following determinative steps:

Step One — Study the workpiece rolling mill and its operation to be controlled, and then establish the desired control system and method concepts.

Step Two — Develop an understanding of the control system logic analysis, regarding both hardware and software.

Step Three — Prepare the system flowcharts and/or the more detailed programmer's flowcharts.

Step Four — Prepare the actual computer instruction program listings from the flowcharts.

What we claim is:

1. A gauge control system for a rolling mill having at least a first roll stand followed by a second roll stand operative to reduce the gauge of a workpiece passed through said rolling mill, said system comprising:
   means for determining a present first gauge error of the workpiece leaving said second roll stand,
   means for determining a present second gauge error of the workpiece leaving said second roll stand in accordance with a predetermined relationship including said first gauge error,
   means for determining a correction for application to said first roll stand during the passage of said workpiece in accordance with a predetermined relationship including said second gauge error of said workpiece, and
   means for controlling the roll opening of said first roll stand during the passage of said workpiece in accordance with said correction.

2. The gauge control system of claim 1, with said second gauge error being determined by the relationship:

$$FBGE(N-1) = GE(N)*[S(N)/S(N-1)]* RF(1) + OLDFBGE(N-1) * RF(2)$$

where $FBGE(N-1)$ is the second gauge error,
where $GE(N)$ is the first gauge error,
where $S(N)$ is related to the speed of the workpiece leaving said second roll stand, where $S(N-1)$ is related to the speed of the workpiece leaving said first roll stand, where $RF(1)$ is a first predetermined response factor, where $OLDFBGE(N-1)$ is the integral of the second gauge error, and where $RF(2)$ is a second predetermined response factor.

3. The gauge control system of claim 1, including means for determining a third gauge error of the workpiece leaving said first roll stand, with said predetermined relationship including said third gauge error.

4. The gauge control system of claim 3, with said predetermined relationship being as follows:

$$\Delta SD(N-1) = [GE(N-1) + FBGE(N-1)] * [K(N-1)/P(N-1)+1]$$

where $\Delta SD(N-1)$ is said correction,
where $GE(N-1)$ is said third gauge error,
where $FBGE(N-1)$ is said second gauge error,
where $K(N-1)$ is the mill spring modulus of said first roll stand, and
where $P(N-1)$ is the workpiece plasticity in relation to said first roll stand.

5. A method of controlling the workpiece gauge leaving a rolling mill having at least a first roll stand followed by a second roll stand operative to reduce the gauge of a workpiece passed through said rolling mill, the steps of said method comprising:

determining a first gauge error of the workpiece leaving said second roll stand in relation to the roll force and the roll opening setting of the second roll stand, determining a second gauge error of the workpiece leaving said second roll stand in relation to said first gauge error, the speed of the second roll stand and the speed of the first roll stand, determining a correction for application to said first roll stand during the passage of said workpiece in accordance with a predetermined relationship including said second gauge error of said workpiece, and controlling the operation of said first roll stand in accordance with said correction.

6. The method of claim 5, with said correction being determined by the relationship:

$$SD(N-1) = FBGE(N-1) * [K(N-1)/P(N-1)+1]$$

where $SD(N-1)$ is said correction,
where $FBGE(N-1)$ is said second gauge error,
where $K(N=1)$ is the mill spring modulus of the first roll stand, and
where $P(N-1)$ is the workpiece plasticity in relation to the first roll stand.

7. The method of claim 5, including the step of determining a third gauge error of the workpiece leaving said first roll stand in relation to the roll force and the roll opening setting of the first roll stand.

8. The method of claim 7, with said correction being determined as follows:

$$\Delta SD(N-1) = [GE(N-1) + FBGE(N-1)] * [K(N-1)/P(N-1)+1]$$

where $\Delta SD(N-1)$ is said correction,
where $GE(N-1)$ is said third gauge error
where $FBGE(N-1)$ is said second gauge error,
where $K(N-1)$ is the mill spring modulus, of said first roll stand, and
where $P(N-1)$ is the workpiece plasticity in relation to said first roll stand.

* * * * *